Figure 2:
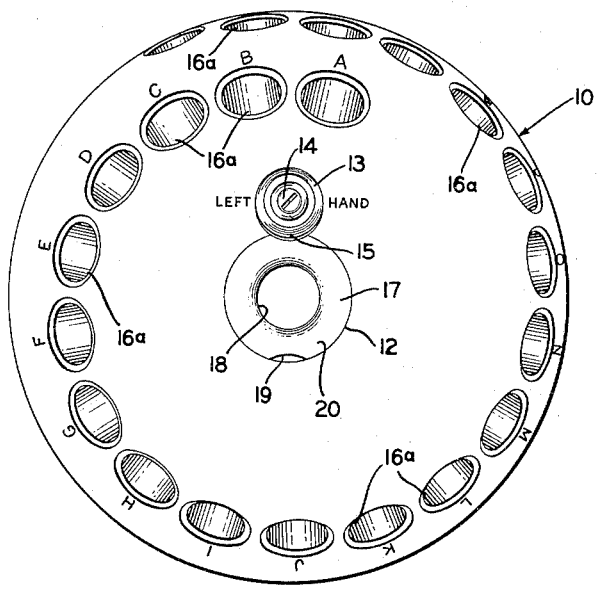

Oct. 4, 1955 M. M. COHAN 2,719,360
BOWLING BALL GRIP FITTING DEVICE
Filed July 8, 1954 2 Sheets-Sheet 1

INVENTOR.
Marvin M. Cohan
BY
Frease & Bishop
ATTORNEYS

INVENTOR.
Marvin M. Cohan
BY Frease & Bishop
ATTORNEYS

United States Patent Office 2,719,360
Patented Oct. 4, 1955

2,719,360

BOWLING BALL GRIP FITTING DEVICE

Marvin M. Cohan, Canton, Ohio

Application July 8, 1954, Serial No. 442,033

13 Claims. (Cl. 33—174)

The invention relates to apparatus for measuring a bowler's grip, and more particularly to a novel and efficient device for accurately measuring an individual purchaser's grip or span to determine the proper location and size of the thumb and finger holes in a bowling ball.

In order to permit a bowling ball to be handled, it is customary to provide the ball with holes into which the thumb and two fingers are inserted for grasping the ball and swinging it to roll it onto the alley. For accuracy in bowling, as well as for the comfort and convenience of the user, these holes should be properly located so as to suit the individual bowler's "grip," this term commonly denoting the proper span or distance between the thumb and finger holes, measured over the circumference of the ball, and also the proper size of thumb and finger holes.

It is therefore customary for the average bowler to purchase his own bowling ball and have the thumb and finger openings bored therein to suit his "grip." As such balls are comparatively expensive, it is important to determine the purchaser's "grip" accurately before boring the holes therein.

It also happens that bowling balls are commonly produced in different weights, usually varying in weight from 13 to 16 pounds, and the average bowler usually prefers a ball of a certain weight.

Therefore, it is desirable not only to accurately determine the proper size and spacing of the thumb and finger holes, but also to enable the purchaser to grasp and swing a properly bored ball of desired weight so as to get the "feel" of the ball.

In view of the fact that in order to fit all sizes of hands, the diameters of the thumb and finger holes may vary from about ⅝ of an inch to 1³⁄₁₆ inches, and the spacing between the holes may vary through a considerable range from about 2½ inches to 5 inches, it will be seen that the combinations possible are quite large in number.

Devices have been proposed for measuring bowler's "grips" but none are entirely satisfactory. Some of these devices are objectionable in that they merely measure the bowler's span but do not permit him to grasp the ball with his thumb and fingers located in properly spaced holes; others are open to the objection that while measuring the span they do not provide for measurement of the proper size of thumb and finger openings; and other prior art devices while affording some degree of measurement of the size of the openings and the bowler's span, are expensive and complicated in construction and include movable parts, which do not produce accurate results. And finally, none of these devices provides for the fitting to be accomplished with a ball weighted to the bowler's own choice.

Accordingly, it is an object of the invention to provide a novel bowling ball fitting device which will efficiently and accurately measure a bowler's "grip."

Another object is to provide such a device having a full range span coverage from the smallest to the largest hand.

A further object is to provide a device of this character in the form of a regulation size bowling ball, which is readily adjustable to the desired weight.

A still further object is to provide a grip fitter of this type adapted for accurately measuring the grip of a left-handed bowler.

Another object of the invention is to provide such a grip fitting device having a socket for selectively receiving thumb hole inserts provided with thumb holes of various sizes.

A further object is to provide a grip fitter in the form of a regulation size bowling ball having a thumb hole therein and a series of finger holes located in a spiral or helix surrounding the thumb hole and spaced progressively further therefrom.

A still further object is to locate this spiral series of finger holes clockwise for measuring a right-handed span, and counter-clockwise for measuring a left-handed span.

Another object is to provide a bowling ball grip fitter of the character referred to, having a socket for selectively receiving weight plug inserts of various weights.

A further object of the invention is to provide such a device having simple and efficient means for locking the thumb hole insert and the weight plug insert in position in the respective sockets.

In general terms the invention may be stated as comprising a bowling ball of regulation size, and of the minimum weight ordinarily used, said ball having two sockets of similar size located at diametrically opposite points, each being adapted to selectively receive either a thumb hole insert or a weight plug insert, and a spirally arranged series of finger holes surrounding each socket and oppositely disposed relative to each other.

Figure 7:
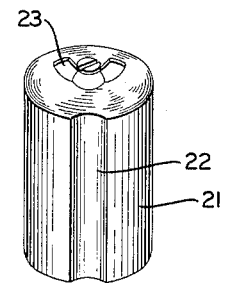
Figure 1:
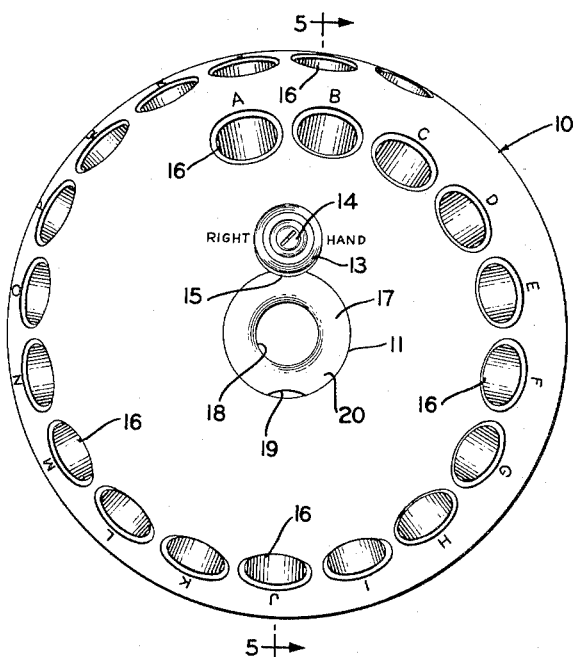
Figure 6:
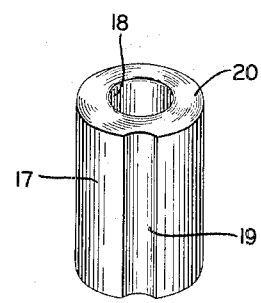
Figure 4:
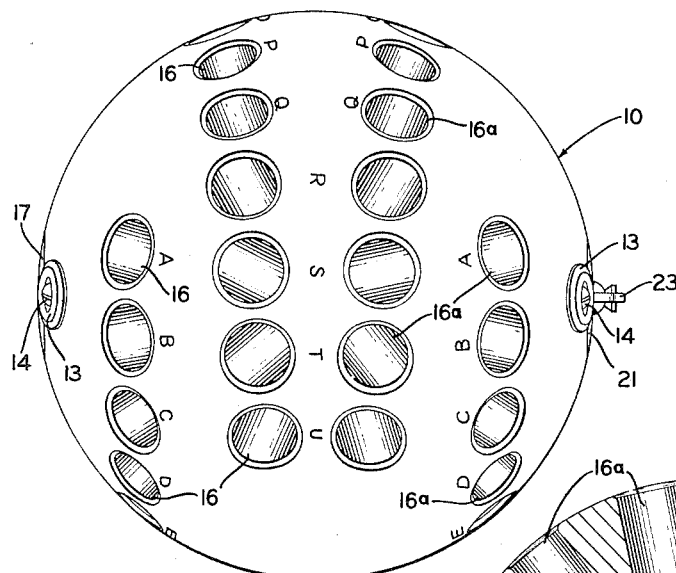
Figure 5:
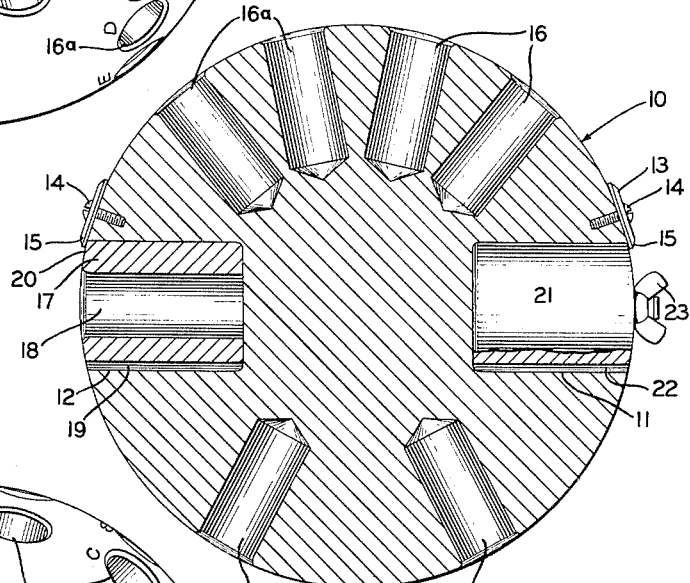
Figure 3:
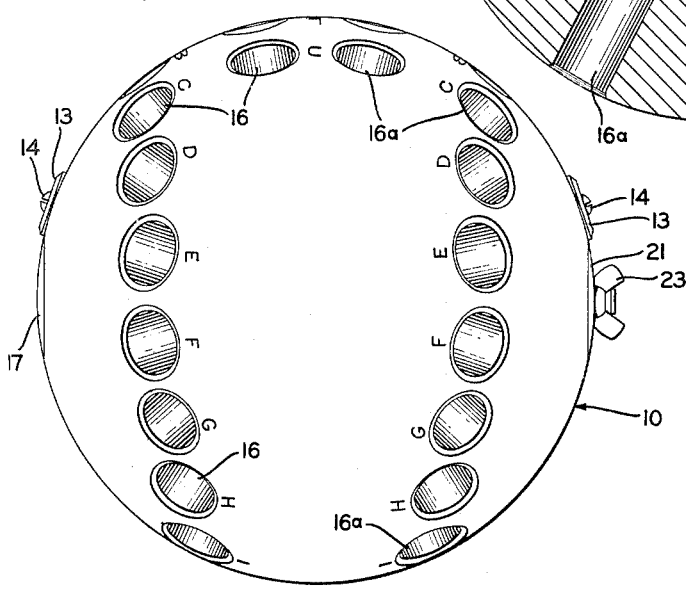

The above objects together with others which will be apparent from the drawing and following description, or which may be later referred to, may be attained by constructing the improved bowling ball grip fitter in the manner hereinafter described in detail and illustrated in the accompanying drawing, in which:

Fig. 1 is an elevation of a bowling ball grip fitting device embodying the invention, showing the side of the ball adapted for measuring right-handed spans;

Fig. 2 a similar view of the opposite side of the ball, showing the side thereof adapted for measuring left-handed spans;

Fig. 3 an elevation of the ball, viewing the same at right angles to Figs. 1 and 2;

Fig. 4 an elevation of the top of the ball, as viewed in Figs. 1 to 3;

Fig. 5 a section through the ball, taken substantially on the line 5—5, Fig. 1;

Fig. 6 a detached, perspective view of one of the thumb hole inserts; and,

Fig. 7 a detached, perspective view of one of the weight plug inserts.

Referring now more particularly to the embodiment of the invention illustrated, in which similar numerals refer to similar parts throughout, the bowler's grip fitting device comprises a bowling ball of standard size such as used in bowling ten-pins, and preferably of the minimum weight of bowling ball commonly used, namely 13 pounds.

Such a ball is indicated at 10 in the drawings, and for the purpose of the invention it is provided at diametrically opposed points with the similar, radially disposed, cylindrical sockets 11 and 12, terminating at points spaced from the center of the ball.

At one side of each of these sockets, a concaved washer 13 is permanently attached to the spherical surface of the ball, as by a screw 14 or other suitable and well-known means. These washers are located in such position that a portion of each washer extends over the open end of the corresponding socket, as indicated at 15, for a purpose to be later described in detail.

Located eccentrically around the socket 11 a spiral series of finger holes 16 are bored in the ball. These finger holes are individually indicated by consecutive letters of the alphabet from A to U, which may be imprinted upon the surface of the ball adjacent to the corresponding finger holes 16.

As best shown in Fig. 1, the finger hole A is located closest to the socket 11, and each succeeding finger hole is located successively at a greater distance from the socket 11. In actual practice the finger hole A is located about 2 inches from the socket 11 and each succeeding finger hole in the series is located about ⅛ inch further from the socket 11 than the next preceding finger hole, so that the spiral series of finger holes from A to U thus continues in a clockwise direction around the socket 11.

The finger holes 16 are preferably all of the same diameter, preferably about 15/16 of an inch, so as to permit the easy insertion therein of fingers of all sizes. The finger holes 16 are preferably located at a slight angle to the radius, as best shown in Fig. 5, and are bored into the ball a sufficient depth to permit the ends of the fingers to be inserted therein in the manner of grasping the ordinary bowling ball.

As shown in the drawings, the finger holes are spaced at intervals corresponding to the natural separation between the fingers, and are placed at progressively increasing distances from the thumb hole socket 11, said distances corresponding to the average natural span increase between thumb and fingers. It will also be apparent that the spiral path of finger holes progresses from the shortest useable distance to the longest useable distance from the thumb hole, thus providing for every span requirement, from the smallest woman's or child's hand to the largest man's hand.

A plurality of cylindrical thumb hole inserts 17 is provided, these inserts being of a diameter and length to have a sliding fit in the socket 11. Each of these inserts has a central bore or thumb hole 18, these holes varying in diameter in the several inserts comprising the set adapted for use with the device.

In actual practice about twenty of these thumb hole inserts are provided, the holes 18 varying in diameter from about ⅝ inch to 1 3/16 inches, so as to accommodate all sizes of human thumbs. Each insert 17 is provided in its outer surface with a longitudinal groove 19, arcuate in cross section of a size and shape corresponding to the overlapped portion 15 of the retaining washer 13. This permits the desired insert 17 to be slidably inserted into the socket 11 by positioning the insert so that the groove 19 therein registers with the overlapped portion 15 of the retaining washer.

After the insert has been thus placed in the socket 11, it may be rotated upon its axis so as to move the groove 19 away from the overlapped portion 15 of the washer, whereby the overlapped portion of the washer engages over the spherical outer end 20 of the insert 17 holding it within the socket 11.

If the purchaser desires a ball heavier than 13 lbs., the weight of the ball 10 with insert 17 therein, a weight plug may be inserted in the socket 12. For this purpose a set of weight plugs 21 is provided, one of which is shown in Fig. 7.

Each of these weight plugs is cylindrical in shape and is of a diameter and length to slidably fit within the socket, and is provided with a longitudinal groove 22 arcuate in cross section and shaped to accommodate the overlapped portion 15 of the retaining washer 13, in the same manner as above described relative to the thumb hole insert.

Any suitable handle may be attached to the outer end of the weight plug 21, as indicated at 23, in order to facilitate the insertion thereof into the socket or the removal therefrom. These weight plugs may be formed of hard rubber or the like with an insert of lead. Preferably three of these weight plugs are provided for use with the device, the respective weights being 1 lb., 2 lbs. and 3 lbs. Thus, by inserting the desired weight plugs, the weight of the ball is increased to 14, 15 or 16 lbs., as desired.

After the selected weight plug and thumb hole inserts have been located in the respective sockets, the customer inserts his thumb into the thumb hole 18 and allows the palm of his hand and fingers to rest flat on the surface of the ball with the fingers extended over the finger holes.

The hand is then turned upon the ball, pivoting upon the thumb in the thumb hole 18, until the second joint of the middle finger extends approximately one-fourth of an inch over the nearest edge of one of the finger holes 16.

The customer may then grasp the ball with the thumb and two fingers, in the same manner in which a bowling ball is grasped in playing ten pins, and swing the ball to get the feel of both the span and weight.

In order to measure the correct size for boring the finger holes, the customer's fingers may be measured with the set of inserts 17. The code letters A to U associated with the several finger holes on the ball indicate the holes for the middle finger.

In connection with the improved grip fitter, the operator refers to a span code book which gives the measurements of the span between each size of thumb hole and each of the finger holes. To determine the ring finger span, for men ¼ inch is added to the middle finger span, and for women ⅛ inch is added.

To determine the pitch or angle at which the finger holes are to be bored into the ball the following chart may be used as a guide:

|  | Span (Middle Finger) | Pitch (thumb) | Pitch (fingers) |
| --- | --- | --- | --- |
| If span is | under 3″ | ½″ fwd | ½″ fwd. |
| If span is | 3″ to 3 7/16″ | ⅜″ fwd | ½″ fwd. |
| If span is | 3½″ to 3¾″ | ¼″ fwd | ⅜″ fwd. |
| If span is | over 3¾″ | zero | ⅜″ fwd. |

The side of the ball shown in Fig. 1 is for a right-handed bowler. If it is desired to measure the grip for a left-hand bowler the opposite side of the ball, shown in Fig. 2, is used.

It will be noted that the finger holes 16a on this side of the ball are arranged in a spiral running in counter-clockwise direction around the socket 12. To measure the grip of a left-handed bowler, the proper size thumb hole insert 17 is inserted into the socket 12 and the prospective customer places the thumb of his left hand in the thumb hole and allows the palm and fingers to rest flat on the ball, with the fingers extended over the span holes 16a, and the measurement is taken as above described relative to the arrangement of Fig. 1.

In using the ball for a left-handed bowler, it should be understood that the desired weight plug insert 21 is inserted in the socket 11 at the opposite side of the ball so that the customer may grip the ball with his thumb and fingers and lift and swing it to get the feel of the grip and weight.

From the above it will be seen that the improved bowling ball grip fitting device embodying the invention provides for an efficient and accurate grip measuring procedure, that it handles every span requirement, from the smallest woman's or child's grip to the longest grip of a large man's hand, covering a range of from 2½″ to 5″ span from edge to edge of the thumb hole and finger hole.

The device is also constructed so as to accurately fit a left-handed bowler, and the weight of the ball is adjustable to the customer's preference. Furthermore, no separate measuring device is needed and no reading of hairline markings is required, so that there is no chance for error in measuring the span distance.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A bowler's grip measuring device comprising a ball having a thumb hole and a series of equally spaced finger holes of equal diameter therein, said finger holes being located in a progressively increasing spiral path surrounding and eccentric to the thumb hole, said finger holes being substantially radially drilled and spaced at intervals corresponding to the natural separation between the fingers, said finger holes being located at progressively increasing distances from the thumb hole, said distances corresponding to the average natural span increase between thumb and fingers, said spiral path of finger holes progressing from the shortest useable to the longest useable distances from the thumb hole.

2. A bowler's grip measuring device comprising a ball having a thumb hole and a series of equally spaced finger holes of equal diameter therein, said finger holes being located in a progressively increasing spiral path completely surrounding and eccentric to the thumb hole, said finger holes being substantially radially drilled and spaced at intervals corresponding to the natural separation between the fingers, the ends of said spiral being overlapped, said finger holes being located at progressively increasing distances from the thumb hole, said distances corresponding to the average natural span increase between thumb and fingers, said spiral path of finger holes progressing from the shortest useable to the longest useable distances from the thumb hole and indicia cooperating with the finger holes denoting the span between the thumb hole and each finger hole.

3. A bowler's grip measuring device comprising a ball having a thumb hole and a series of equally spaced finger holes of equal diameter therein, said finger holes being located in a progressively increasing spiral path surrounding and eccentric to the thumb hole, said finger holes being substantially radially drilled and spaced at intervals corresponding to the natural separation between the fingers, said spiral path continuing in clockwise direction from the finger hole nearest to the thumb hole to the finger hole farthest therefrom, said finger holes being located at progressively increasing distances from the thumb hole, said distances corresponding to the average natural span increase between thumb and fingers, said spiral path of finger holes progressing from the shortest useable to the longest useable distances from the thumb hole.

4. A bowler's grip measuring device comprising a ball having a thumb hole and a series of equally spaced finger holes of equal diameter therein, said finger holes being located in a progressively increasing spiral path surrounding and eccentric to the thumb hole, said finger holes being substantially radially drilled and spaced at intervals corresponding to the natural separation between the fingers, said spiral path continuing in counterclockwise direction from the finger hole nearest to the thumb hole to the finger hole farthest therefrom, said finger holes being located at progressively increasing distances from the thumb hole, said distances corresponding to the average natural span increase between thumb and fingers, said spiral path of finger holes progressing from the shortest useable to the longest useable distances from the thumb hole.

5. A bowler's grip measuring device comprising a ball having a thumb hole and a series of equally spaced finger holes of equal diameter therein, said finger holes being located in a progressively increasing spiral path surrounding and eccentric to the thumb hole, said finger holes being substantially radially drilled and spaced at intervals corresponding to the natural separation between the fingers, said finger holes being located at progressively increasing distances from the thumb hole, said distances corresponding to the average natural span increase between thumb and fingers, said spiral path of finger holes progressing from the shortest useable to the longest useable distances from the thumb hole there being a socket in said ball, and a removable weight plug insert in said socket.

6. A bowler's grip measuring device comprising a ball having a socket therein, a removable thumb hole insert located in said socket and having a concentric thumb hole therein, there being a series of equally spaced finger holes in the ball, said finger holes being located in a progressively increasing spiral path surrounding and eccentric to said socket, said finger holes being substantially radially drilled and spaced at intervals corresponding to the natural separation between the fingers, said finger holes being located at progressively increasing distances from the thumb hole, said distances corresponding to the average natural span increase between thumb and fingers, said spiral path of finger holes progressing from the shortest useable to the longest useable distances from the thumb hole.

7. A bowler's grip measuring device comprising a ball having a socket therein, a removable thumb hole insert located in said socket and having a concentric thumb hole therein, means detachably retaining the insert in said socket, there being a series of equally spaced finger holes in the ball, said finger holes being located in a progressively increasing spiral path surrounding and eccentric to said socket, said finger holes being substantially radially drilled and spaced at intervals corresponding to the natural separation between the fingers, said finger holes being located at progressively increasing distances from the thumb hole, said distances corresponding to the average natural span increase between thumb and fingers, said spiral path of finger holes progressing from the shortest useable to the longest useable distances from the thumb hole.

8. A bowler's grip measuring device comprising a ball having a socket therein, a removable thumb hole insert located in said socket and having a concentric thumb hole therein, a retaining member located over a portion of the end of the socket, the insert having a longitudinal groove in one side to receive said retaining member, whereby the insert will be retained by rotation thereof in the socket, there being a series of equally spaced finger holes in the ball, said finger holes being located in a progressively increasing spiral path surrounding and eccentric to said socket, said finger holes being substantially radially drilled and spaced at intervals corresponding to the natural separation between the fingers, said finger holes being located at progressively increasing distances from the thumb hole, said distances corresponding to the average natural span increase between thumb and fingers, said spiral path of finger holes progressing from the shortest useable to the longest useable distances from the thumb hole.

9. A bowler's grip measuring device comprising a ball having a socket therein, a removable thumb hole insert located in said socket and having a concentric thumb hole therein, there being a series of equally spaced finger holes in the ball, said finger holes being located in a progressively increasing spiral path surrounding and eccentric to said socket, said finger holes being substantially radially drilled and spaced at intervals corresponding to the natural separation between the fingers, said finger holes being located at progressively increasing distances from the thumb hole, said distances corresponding to the average natural span increase between thumb and fingers, said spiral path of finger holes progressing from the shortest useable to the longest useable distances from the thumb hole and indicia cooperating with the finger holes denoting the span between the thumb hole and each finger hole.

10. A bowler's grip measuring device comprising a ball having a socket therein, a removable thumb hole insert located in said socket and having a concentric thumb hole therein, there being a series of equally spaced finger holes in the ball, said finger holes being located in a progressively increasing spiral path surrounding and eccentric to said socket, said finger holes being substantially radially drilled and spaced at intervals corresponding to the natural separation between the fingers, said spiral path continuing in clockwise direction from the finger hole nearest to the socket to the finger hole farthest therefrom, said finger holes being located at progressively increasing distances from the thumb hole, said distances corresponding to the average natural span increase between thumb and fingers, said spiral path of finger holes progressing from the shortest useable to the longest useable distances from the thumb hole.

11. A bowler's grip measuring device comprising a ball having a socket therein, a removable thumb hole insert located in said socket and having a concentric thumb hole therein, there being a series of equally spaced finger holes in the ball, said finger holes being located in a progressively increasing spiral path surrounding and eccentric to said socket, said finger holes being substantially radially drilled and spaced at intervals corresponding to the natural separation between the fingers, said spiral path continuing in counter-clockwise direction from the finger hole nearest to the socket to the finger hole farthest therefrom, said finger holes being located at progressively increasing distances from the thumb hole, said distances corresponding to the average natural span increase between thumb and fingers, said spiral path of finger holes progressing from the shortest useable to the longest useable distances from the thumb hole.

12. A bowler's grip measuring device comprising a ball having diametrically opposed similar sockets therein, there being a series of equally spaced finger holes surrounding and eccentric to each socket, each series of finger holes being located in a progressively increasing spiral path, said spiral paths being oppositely disposed, said finger holes being located at progressively increasing distances from the thumb hole, a removable thumb hole insert having a concentric thumb hole therein, a removable weight plug insert, said inserts being interchangeable, and means for retaining either of said inserts in either socket and the other insert in the other socket.

13. A bowler's grip measuring device comprising a ball of a weight equal to the minimum weight of standard bowling balls, there being diametrically opposed sockets in the ball, there being a series of equally spaced finger holes surrounding and eccentric to one of said sockets, said finger holes being located in a progressively increasing spiral path from the finger hole nearest to said one socket to the finger hole farthest therefrom, said finger holes being located at progressively increasing distances from the thumb hole, a removable thumb hole insert having a concentric thumb hole therein located in said one socket and a plurality of weight plug inserts of different weights for selective insertion into the other socket for increasing the weight of the ball to any other standard weights of bowling balls.

References Cited in the file of this patent

UNITED STATES PATENTS

| 2,188,868 | Shepard | Jan. 30, 1940 |
| 2,242,980 | Nicholas | May 20, 1941 |
| 2,342,033 | Barabas | Feb. 15, 1944 |
| 2,503,324 | Collins | Apr. 11, 1950 |
| 2,548,197 | O'Conner | Apr. 10, 1951 |